United States Patent
Palamountain et al.

(10) Patent No.: US 7,854,953 B2
(45) Date of Patent: Dec. 21, 2010

(54) FOODSTUFF SUPPLEMENT AND METHOD OF PRODUCING SAME

(75) Inventors: John Richard Palamountain, Wanganui (NZ); Ruth Erica Palamountain, Wanganui (NZ); Brian Herbert Patrick Wilkinson, Palmerston North (NZ)

(73) Assignee: Vita Power Limited, Wanganui (NZ)

( * ) Notice: Subject to any disclaimer, the term of this patent is extended or adjusted under 35 U.S.C. 154(b) by 1161 days.

(21) Appl. No.: 10/490,380

(22) PCT Filed: Oct. 18, 2002

(86) PCT No.: PCT/NZ02/00220

§ 371 (c)(1),
(2), (4) Date: Apr. 2, 2004

(87) PCT Pub. No.: WO03/032750

PCT Pub. Date: Apr. 24, 2003

(65) Prior Publication Data

US 2005/0003046 A1    Jan. 6, 2005

(30) Foreign Application Priority Data

| Oct. 19, 2001 | (NZ) | ..... 514900 |
| Apr. 23, 2002 | (NZ) | ..... 518517 |
| Jul. 5, 2002 | (NZ) | ..... 520009 |
| Sep. 13, 2002 | (NZ) | ..... 521339 |

(51) Int. Cl.
 *A23D 7/00* (2006.01)
 *A23K 1/175* (2006.01)

(52) U.S. Cl. .......... 426/607; 426/72; 426/311; 426/585; 426/603; 426/604

(58) Field of Classification Search .......... None
See application file for complete search history.

(56) References Cited

U.S. PATENT DOCUMENTS

| 3,998,753 | A |  | 12/1976 | Antoshkiw et al. |
| 5,180,747 | A |  | 1/1993 | Matsuda et al. |
| 5,658,767 | A | * | 8/1997 | Kyle .......... 435/134 |
| 5,976,603 | A | * | 11/1999 | Kota et al. .......... 426/590 |
| 5,998,396 | A |  | 12/1999 | Nakano et al. |
| 6,159,507 | A | * | 12/2000 | Igarashi .......... 426/2 |
| 6,180,144 | B1 | * | 1/2001 | Hill et al. .......... 426/3 |
| 6,592,863 | B2 | * | 7/2003 | Fuchs et al. .......... 424/93.1 |
| 2002/0054947 | A1 | * | 5/2002 | Kloti .......... 426/523 |

FOREIGN PATENT DOCUMENTS

| EP | 0278284 A1 | 8/1988 |
| GB | 2280449 | 2/1995 |
| GB | 2280449 A | 2/1995 |
| JP | 06172170 A | 6/1994 |
| JP | 08067666 A | 3/1996 |
| WO | WO 92/07477 | 5/1992 |
| WO | WO 94/04045 | 3/1994 |
| WO | WO 97/35487 | 2/1997 |
| WO | WO 97/35488 | 10/1997 |
| WO | WO 02/24165 | 3/2002 |

* cited by examiner

Primary Examiner—Patricia Leith
(74) Attorney, Agent, or Firm—Oblon, Spivak, McClelland, Maier & Neustadt, L.L.P.

(57) ABSTRACT

A foodstuff supplement and method of producing the foodstuff supplement. The method includes forming a liquid phase and adding vitamins to the liquid phase at a temperature below that at which significant depletion and/or degradation of the vitamins will occur. Oil is heated in a vessel and an emulsifier is added to the heated oil. The resultant mixture is cooled and the liquid phase is added.

18 Claims, 4 Drawing Sheets

Flow Chart for Preparation of Water Phase

Add garlic to water

↓

Boil

↓

Add yeast extract + meat extract + attractants

↓

Mix and hold for 10 minutes

↓

Add preservatives and attractants

↓

Cool to 24-28°C

↓

Add multivitamins

FIGURE 1

Flow Chart for Preparation of Emulsion

Oil in stirred vessel
↓
Heat to 60-76°C
↓
Add emulsifier
↓
Cool to approximately 38°C-45°C
↓
Add water phase
↓
Cool to approximately 27°C-44°C
↓
Pack in appropriate containers
↓
Chill

FIGURE 2

Flow Chart for Preparation of Emulsion

Oil in stirred vessel

↓

Heat to 60-76°C

↓

Add emulsifier

↓

Cool to approximately 38°C-45°C

↓

Add water phase

↓

Cool to approximately 27°C-44°C

↓

Chill

↓

Pack in appropriate containers

FIGURE 3

Multivitamins and/or Minerals

Gum or protein etc. →     Mixer

↓

Sieved

↓

Encapsulating film →     Fluid Bed

↓

Sieved

Figure 4

FOODSTUFF SUPPLEMENT AND METHOD OF PRODUCING SAME

BACKGROUND OF THE INVENTION

The present invention relates to a foodstuff supplement and method of producing same. The supplement has particular application as a foodstuff supplement for improving the condition of animals, including humans.

This invention more particularly relates to incorporation of multivitamins and possibly certain minerals in an oil emulsion environment without any substantial loss in vitamin potency and in a resultant product, which exhibits good shelf life capability.

Presently, there is an interest on the part of pet food manufacturers to improve the health status of pets. Firstly a manufacturer endeavours to ensure that it produces a balanced pet food that includes all the essential macronutrients in the correct proportions. Secondly the manufacturer endeavours to include in the pet food all the essential vitamins and minerals (micronutrients).

Most of these essential micronutrients are included in pet foods at the time of manufacture. Dry food pet food manufacturers may, for example, spray multivitamins on the products after they exit the drier or extruder.

Pet foods generally undergo some form of heating regime to at least pasteurise the product and in many cases to commercially sterilise the product. The purpose of the heating regime is to minimise the risk of producing foods that could potentially cause a food poisoning problem.

Potentially most multivitamins are quite unstable to heating regimes used during the manufacture of most pet foods. In the cases of ascorbic acid, niacin, riboflavin and thiamine these heating regimes may destroy between 75-100% of the activity of the aforementioned vitamins. Most of the other vitamins lose between 40-75% of their activity in typical heating regimes that are used by the food industry.

Consequently because of the typical heating regimes that are used by the food industry, pet foods are produced which have less than the ideal multivitamin content. This then has a domino affect on the health status of pets when fed on these commercially prepared pet foods. Anecdotal evidence suggests that the pets do not thrive if fed solely on one of the commercially prepared pet foods.

The pet food companies can minimise the effects of the aforementioned heating regimes by including excesses of the labile multivitamins. However, even in these circumstances there is no guarantee that such an approach will work as most of the vitamin heat stability trials have been conducted on simple model food systems and not on the complex food systems to be found in commercially prepared pet foods.

Commercial pet food manufacturers generally do not measure the vitamin content of their products. This is generally due to the analysis cost for a complete range of multivitamins being extremely high. Consequently, manufacturers tend to estimate the vitamin content of their products after processing by using a starting values and decreasing these according to kinetic considerations.

The health status of farm working animals e.g. dogs, as a consequence of dietary considerations, is also a problem in New Zealand. For example, farmers tend to feed dogs animals with either raw or cooked meat or dried biscuits especially formulated for pets or a combination of meat and biscuits. These animals tend to be given a minimal amount of food and as a consequence are reported to suffer from essential mineral and vitamin deficiencies. The problems which can arise with working animals are also relevant to sporting animals and domestic pets.

In particular, working or sporting animals such as greyhounds, racehorses, show horses, rural dogs, pig dogs etc that rely on stamina, energy and general good health are prone to the daily deficiencies. Due to processed foods and household scraps domestic animals including cats also show signs of deficiencies and require polyunsaturated oils and essential vitamins and some minerals included in their daily diet too.

SUMMARY OF THE INVENTION

Broadly in one aspect of the present invention there is provided a method of producing a foodstuff supplement including the steps of:
  (a) forming a liquid phase;
  (b) adding vitamins to the liquid phase at a temperature below that at which significant depletion and/or degradation of the vitamins will occur;
  (c) heating oil in a vessel;
  (d) adding an emulsifier to the heated oil;
  (e) cooling the oil/emulsifier mixture; and
  (f) adding the liquid phase of step (b).

Preferably the liquid phase of step (a) is cooled to a temperature of between substantially 20-30° C. prior to addition of the vitamins.

Preferably the oil is heated to between substantially 60° C. and 76° C. in the vessel.

Preferably the oil/emulsifier is cooled to a temperature of substantially 38-45° C. before step (f) is carried out.

Preferably after step (f) the contents of the vessel is cooled to a temperature of substantially between 44° C. and 27° C.

Preferably upon the temperature of substantially 36° C. being reached the contents of the vessel is filled into containers.

Preferably each container when filled is placed into a chiller. The chiller can be a recirculating water bath with the water preferably being at substantially 2° C. or less.

Preferably upon the temperature of substantially 36° C. being reached, the contents of the vessel is moved through a heat exchanger to reduce the temperature of the mixture. In the preferred form of the invention the temperature is reduced to about 10° C.-19° C. Movement of the mixture through the heat exchanger is continuous with the mixture issuing from the heat exchanger being filled into containers.

Preferably the vitamins include both water soluble and oil soluble vitamins. The liquid phase of step (a) preferably includes water.

Preferably the oil is a poly-unsaturated oil, but more preferably, canola oil.

According to the present invention there is also provided a foodstuff supplement prepared according to the process of the first broad aspect of the invention.

BRIEF DESCRIPTION OF THE DRAWINGS

The following more detailed description of preferred embodiments of the invention will be made with reference to the accompanying flow charts in which:—

FIG. 1 is a flow chart for preparation of ingredients including vitamins into a liquid phase for incorporation into oil to create an emulsion, FIG. 2 is a flow chart for production (according to one embodiment) of an emulsion in which are incorporated the ingredients of the liquid phase achieved in FIG. 1, and FIG. 3 is a flow chart similar to FIG. 2 but in relation to a second embodiment of the production method, and FIG. 4 is a flow chart for production of encapsulated vitamins and/or mineral microgranules.

DESCRIPTION OF THE PREFERRED EMBODIMENTS

Referring to FIG. 1 ingredients including water and oil soluble vitamins are combined into a liquid phase for mixing with heated oil to which has been added an emulsifier. It will be appreciated by those skilled in the art that the actual, ingredients in the liquid phase can vary depending on the end use of the product. For example, while the following preferred embodiment discloses the use of meat extracts the process when producing a product for use with say horses will be one where the meat extract(s) is/are omitted. Also, there may be variations in the multivitamins depending on the target animal and even local conditions. Therefore, the following disclosure should be seen as solely giving an example of one form that the invention can take.

According to the present example yeast extract and garlic powder are added to boiling water and mixed in, for example, a commercial mixer. Preferably, however, the garlic is pre-boiled in water. Yeast extract is then added to the boiling water/garlic mixture. The resultant mixture is mixed and held for ten minutes. The resultant process ensures that pasteurisation of the garlic and yeast occurs.

Preferably the mixing is carried out for the aforementioned 10 minutes, whereupon to this mixture is added a meat extract, which generally will be already pasteurised, but if not the meat extract can be added to the previously described mixture during the pasteurising stage.

A suitable preservative is also added e.g. potassium sorbate. Also an acid rectifier can be added such as sodium acid pyrophosphate.

The total mixture is then cooled to a temperature somewhere in the range of 20-30° C.

Separately a dry multi-vitamin mixture is prepared. This will include both water soluble and oil soluble vitamins. The vitamin mixture is added to the aforementioned mixture such addition taking place after the mixture has cooled to a temperature within range of 20-30° C. The mixture is left standing for a suitable period so that the water soluble vitamins dissolve. The oil soluble vitamins will remain undissolved. The liquid phase is then ready to add to the oil phase as hereinafter described.

Oil such as a polyunsaturated or canola oil is heated in a heated vessel. The oil is continuously stirred with a suitable agitator and is heated to above 60° C. preferably heated to approximately 70° C. or up to 76° C. A high melting point emulsifier is then added to the oil as the mixing/stirring of the oil continues. In a preferred form of the invention the emulsifier is a blend of mono-, di- and triglycerides based on edible, fully hydrogenated vegetable oil. The emulsifier is based on raw materials which are not of genetically modified origin according to the definition given in EU Directive 90/220/EEC,Art.2. The emulsifier prevents oiling out in all fat-containing products.

The oil/emulsifier mixture is then cooled to a temperature in the range of about 38-45° C. whereupon the water phase with the added multivitamins is stirred and added into the oil/emulsifier mixture (which continues to be stirred). Stirring continues while the resultant mixture cools down to between about 44-27° C., preferably about 36° C. and an emulsion starts to form. In any event mixture in the vessel is not permitted to cool below 27° C. otherwise separation occurs. The oil soluble vitamins will dissolve into the oil.

The emulsifying mixture is then removed from the vessel and placed into containers e.g. plastic bottles. Immediately a bottle is filled it is placed in a circulating water bath supplied with water at 2° C. or less. The bottles then remain in the water bath for a suitable length of time until the product sets or stabilises into a stable emulsion. For example, with a five liter plastic container filled with the emulsion the container is retained in the circulating water bath for upwards of two hours or even longer.

In an alternative and preferred arrangement the contents of the vessel upon reaching a temperature of substantially 30° C. is removed from the vessel by being pumped through a heat exchanger. The mixture issuing from the heat exchanger is then filled into containers. During its passage through the heat exchanger the temperature of the mixture is reduced and preferably reduced to between about 10° C.-19° C., this being the temperature at which it issues from the heat exchanger.

In one form of the invention the heat exchanger can be formed by a stainless steel coiled tubing situated inside a tank of chilled water at preferably 0 to 5 degrees (minus). The contents is pumped through and immediately bottled (preferably using plastic containers) at a temperature of preferably 10° C. to 19° C. As an alternative a plate heat exchanger could be used in place of the equipment mentioned above.

Means are provided for circulating chilled water through the dairy vat so as to maintain the correct heat exchange action. In the preferred form of the invention the coiled pipe is normally of 20 mm diameter.

A pump or ramming arrangement is provided between the vessel and the vat so as to move the emulsifying mixture through the coiled pipe. Because of the emulsifying nature of the mixture the movement of the mixture through the conduit between the vessel and the vat as well as through the heat exchanger, is continuous. Also the means by which the mixture is moved through the heat exchanger is one which effectively provides a ramming effect, given the emulsifying nature of the mixture. The mixture as it issues from the heat exchanger is continuously dispensed and preferably is continuously dispensed into point of sale containers or bulk container.

It has been found that this arrangement provides for greater production throughput than the chilled water bath mentioned in the previously described embodiment of the invention. It also provides the advantage that it overcomes a problem with the chiller bath arrangement where the cooling water can sometimes gain access to the content of product within the individual containers if good sealing of the cap on the container is not achieved.

The process is thus completed and the contents of the bottle/container will remain as a stable emulsion i.e. the component parts do not separate out.

The oil phase of the animal foodstuff supplement of this invention is intended to inter alia promote the health of the animals. It is thus proposed that the oil will be based on a polyunsaturated canola, linseed, olive, avocado, sunflower and fish oil to- supply the required omega fatty acids for e.g. working dogs.

Unfortunately the aforementioned oils are highly susceptible to oxidation. As the expected shelf life of the commercial form of the supplement product is to be at least twelve months anything that can accelerate the rate of oxidation must or prevented from triggering oxidation both of the oils and of the essential fatty acids. The food supplement formed according to the process of this invention exhibits a stable emulsion with sufficient shelf life for commercial purposes. The mineral content of the product is confirmed to those added by e.g. the meat extract. However, it has been discovered that oxidation which could ruin the product before consumption i.e. by a use by date does not occur.

According to another embodiment of the present invention essential minerals, vitamins and medicines can be incorporated in micro-granules coated with a water and oil-impermeable film coating. This coating will in use prevent the minerals from oxidizing the unsaturated oil component of a liquid oil or emulsion portion of feed or the multivitamin portion of feed. The coating is of a type which will solubilize when the feed/oil enters the low pH milieu of the animal's stomach thus freeing the encapsulated multivitamins and minerals for absorption in the intestine. The film withstands heat treatments and most mechanical shearing.

The microencapsulated granules can be produced either as a dry powder or can be included in the liquid delivery system as disclosed above.

Referring to FIG. 4 the microgranules are formed by adding an appropriate amount of either the minerals or the multivitamins or both to a mixer plus an appropriate amount of a gum wax, protein, fat or other compound that will assist the powdered components to bind together to form granules. The amount of gum, protein etc. that is added at this stage will have a bearing on the ultimate granule particle size. The so formed granules are then sieved to ensure that particles of the correct dimensions are used for subsequent process steps. Particles in excess of the desired size are reground and resieved to minimise product losses. Particles that are too small are returned to the mixer and agglomerated further.

A drying stage may be necessary depending on which binder is used to agglomerate the powdered supplement. The appropriate sized microgranules are then coated with an edible, water and oil insoluble film. This can be achieved in a number of ways.

According to one form of the invention the granules are coated by recirculating them in a fluidised bed into which a spray of the appropriate edible film is directed. The microgranules are coated with this edible film and after an appropriate length of time the granules have the desired film thickness. Once a satisfactory thickness of film has been applied the coated granules are removed from the fluidised bed and dried. After drying the granules are sized to ensure that they have the correct size distribution.

A spray drying process can also be employed to product these microgranules. A liquid mixture consisting of water, a starch and/or gum and/or wax, plus either the minerals or vitamins or medicines are spray dried. The vitamins, minerals or medicines tend to be sealed inside a coating of the gum/starch/wax mixture. These are then sieved. Particles with diameters ranging from 5-200 microns are retained for inclusion in the emulsion. Larger particles are reground and re-processed.

The granules can then be either added to a powder for application as a dried food or they can be included in an oil or water or emulsion that contains the appropriate amount of other additives as described earlier. If the delivery system is an oil or water then an appropriate thickener such as a gum or other viscosity aid can be added to the oil or water to ensure that the added microgranules remain in suspension throughout the product's shelf life.

According to the preferred method an oil emulsifier is used as described previously. Once the cooling stage has been completed microgranules with water and pet/animal attractants (the water phase) are added while mixing takes place.

As identified above current pet food production methods involve vitamins being added to the product during manufacture. Multivitamins that are added prior to the heat processing stages are often substantially depleted during the heating stage. In the present process the multivitamins are not subjected to temperatures which will degrade or render less effective the multivitamins. This is due to the multivitamins being added to the liquid phase and then the oil/emulsifier mix at a temperature less than that at which degradation would normally occur.

It is known to give pets multivitamin pills and potions with their feed. As these are either in the powdered form or tablets pet owners often have great difficulty in getting the pet to take multivitamins and mineral supplements. Pets will often refuse to consume food with added powders because they are unpalatable and will fail to swallow tablets of any kind. Thus pet owners have great difficulty in dosing their animals with any kind of supplement using existing production technologies.

The present invention will overcome these difficulties because the multivitamins are provided in a liquid product which can be poured or possibly sprayed onto the food prior to consumption by the animal. The composition of the product will preferably include a pet attractant to ensure high palatability. In addition appropriate colorants, acids and other desirable ingredients can also be added to the product to improve product palatability. Pets will thus not taste the bitter flavours of the vitamins and as a consequence, should not reject them.

It is believed that the present invention provides a means of overcoming the major difficulties typically associated with ensuring that essential vitamins and minerals are included in a foodstuff, in particularly pet food, can be overcome. With animals, especially horses and domestic working farm dogs, the present invention is believed to provide a means of producing nutrient deficiencies which are often found in such animals.

The invention claimed is:

1. A method of producing a foodstuff supplement in the form of a water-in-oil emulsion, comprising:
   (a) forming a liquid phase and cooling the liquid phase to a temperature of 20-30° C.;
   (b) adding vitamins to the cooled liquid phase;
   (c) heating oil in a vessel to a temperature of 60-76° C.;
   (d) adding an emulsifier to the heated oil to make an oil/emulsifier mixture;
   (e) cooling the oil/emulsifier mixture to a temperature of 38-45° C.;
   (f) adding the liquid phase of step (b) and mixing the liquid phase and the cooled oil/emulsifier mixture to form the water-in-oil emulsion;
   (g) cooling the water-in-oil emulsion to a temperature of from 44° C. to 27° C. to form a stable water-in-oil emulsion; and
   (h) passing the stable water-in-oil stable emulsion through a heat exchanger to lower the temperature of the stable emulsion.

2. The method of claim 1, wherein after step (f) the contents of the vessel are filled into containers before step h.

3. The method of claim 2, wherein each container when filled is placed into a chiller.

4. The method of claim 3, wherein the chiller is a recirculating water bath with the water being at 2° C. or less.

5. The method of claim 1, wherein the vitamins include both water soluble and oil soluble vitamins.

6. The method of claim 5, wherein the liquid phase of step (a) includes water.

7. The method of claim 6, wherein the oil comprises a polyunsaturated oil.

8. The method of claim 6, wherein the oil comprises canola oil.

9. The method of claim 1, wherein in step (h) the temperature is further reduced to between 10° C. and 19° C.

10. The method of claim 9, wherein product issuing from the heat exchanger is placed in containers.

11. The method of claim 1, wherein the vitamins are added to a prior prepared mixture of yeast and optionally meat extracts to form the liquid phase.

12. The method of claim 1, wherein the oil comprises canola oil.

13. The method of claim 1, wherein the oil comprises polyunsaturated oil.

14. The method of claim 1, wherein the emulsifier is a blend of mono-, di- and tri-glycerides derived from edible, fully hydrogenated vegetable oil.

15. The method of claim 1, wherein the vitamins are incorporated in micro granules coated with a water and oil impermeable film coating.

16. The method of claim 1, wherein the liquid phase formed in step (a) comprises water and a pasteurized meat extract.

17. The method of claim 1, wherein one or more vitamins selected from the group consisting of ascorbic acid, niacin, riboflavin and thiamin are added to the liquid phase in step (b).

18. The method of claim 1, wherein the food stuff supplement is a pet food stuff supplement.

* * * * *